(12) United States Patent
Motohashi et al.

(10) Patent No.: US 10,907,280 B2
(45) Date of Patent: Feb. 2, 2021

(54) PRODUCTION METHOD FOR PARTIALLY SEPARATED FIBER BUNDLE, PARTIALLY SEPARATED FIBER BUNDLE, FIBER-REINFORCED RESIN MOLDING MATERIAL USING PARTIALLY SEPARATED FIBER BUNDLE, AND PRODUCTION METHOD FOR FIBER-REINFORCED RESIN MOLDING MATERIAL USING PARTIALLY SEPARATED FIBER BUNDLE

(71) Applicant: Toray Industries, Inc., Tokyo (JP)

(72) Inventors: Tetsuya Motohashi, Nagoya (JP); Takafumi Hashimoto, Nagoya (JP); Masaru Tateyama, Nagoya (JP); Mitsuki Fuse, Nagoya (JP); Akihiko Matsui, Nagoya (JP); Chiasa Sato, Nagoya (JP)

(73) Assignee: Toray Industries, Inc., Tokyo (JP)

( * ) Notice: Subject to any disclaimer, the term of this patent is extended or adjusted under 35 U.S.C. 154(b) by 116 days.

(21) Appl. No.: 16/308,593

(22) PCT Filed: Jun. 1, 2017

(86) PCT No.: PCT/JP2017/020406
§ 371 (c)(1),
(2) Date: Dec. 10, 2018

(87) PCT Pub. No.: WO2017/221658
PCT Pub. Date: Dec. 28, 2017

(65) Prior Publication Data
US 2019/0153632 A1 May 23, 2019

(30) Foreign Application Priority Data

Jun. 22, 2016 (JP) .................................. 2016-123437
Jun. 22, 2016 (JP) .................................. 2016-123438

(51) Int. Cl.
*D02J 1/18* (2006.01)
*D02J 1/08* (2006.01)
(Continued)

(52) U.S. Cl.
CPC .............. *D02J 1/18* (2013.01); *B29B 15/122* (2013.01); *B65H 51/005* (2013.01); *D02J 1/08* (2013.01); *B29C 70/18* (2013.01)

(58) Field of Classification Search
CPC ....... D02J 1/18; D02J 1/20; D02J 1/08; B29B 15/122; B29C 70/18; D01D 11/02; D01G 9/00; B65H 51/005
See application file for complete search history.

(56) References Cited

U.S. PATENT DOCUMENTS 3,034,180 A * 5/1962 Greiner .................. D04H 1/495
19/301
3,208,125 A * 9/1965 Hall ......................... D02G 1/00
28/219
(Continued)

FOREIGN PATENT DOCUMENTS

EP 2 687 356 A1 1/2014
JP 2002-255448 A 9/2002
(Continued)

*Primary Examiner* — Amy Vanatta
(74) *Attorney, Agent, or Firm* — DLA Piper LLP (US)

(57) ABSTRACT

A method of producing a partially separated fiber bundle includes a partial separation processing step for alternately forming separation-processed sections, each divided into a plurality of bundles, and not-separation-processed sections along the lengthwise direction of a fiber bundle, wherein a separation means provided with a plurality of projected parts is penetrated into the fiber bundle to create separation-processed parts, the separation means is removed from the fiber bundle, and the separation means is penetrated into the fiber bundle again, characterized in that a sizing agent is applied at an arbitrary timing during the production process
(Continued)

of the partially separated fiber bundle. A partially separated fiber bundle is obtained by the production method, a fiber-reinforced resin molding material uses the partially separated fiber bundle, and a production method makes the fiber-reinforced resin molding material.

6 Claims, 10 Drawing Sheets

(51) Int. Cl.
*B65H 51/005* (2006.01)
*B29B 15/12* (2006.01)
*B29C 70/18* (2006.01)

(56) References Cited

U.S. PATENT DOCUMENTS

| | | | | |
|---|---|---|---|---|
| 3,255,506 | A * | 6/1966 | Fritz | B01D 39/18 156/433 |
| 3,460,416 | A * | 8/1969 | Gilbert | B26F 1/24 83/30 |
| 4,070,815 | A * | 1/1978 | Negishi | D02J 1/08 57/208 |
| 4,495,017 | A * | 1/1985 | Abe | B29B 15/122 156/181 |
| 5,176,775 | A * | 1/1993 | Montsinger | B29B 15/122 118/123 |
| 6,032,342 | A * | 3/2000 | Kawabe | D01G 9/08 28/283 |
| 6,094,791 | A * | 8/2000 | Akase | D02J 1/18 28/282 |
| 6,684,468 | B1 * | 2/2004 | Lujan | D02J 1/18 28/103 |
| 7,323,244 | B2 * | 1/2008 | Cho | D01F 6/62 428/369 |
| 2004/0043213 | A1 * | 3/2004 | Tonon | B29B 15/125 428/367 |
| 2006/0137156 | A1 * | 6/2006 | Kawabe | B29C 70/20 28/271 |
| 2012/0213997 | A1 | 8/2012 | Wang et al. | |
| 2015/0203642 | A1 * | 7/2015 | Sonoda | D04H 1/4342 428/219 |
| 2015/0233024 | A1 * | 8/2015 | Mishima | B65H 69/061 423/447.6 |
| 2015/0259832 | A1 * | 9/2015 | Oosawa | D04H 1/4218 28/282 |
| 2016/0083873 | A1 * | 3/2016 | Kawabe | D02J 1/18 28/283 |
| 2016/0369071 | A1 * | 12/2016 | Ohtani | C08K 9/04 |
| 2020/0173100 | A1 * | 6/2020 | Sinha | B29B 15/122 |

FOREIGN PATENT DOCUMENTS

| | | | |
|---|---|---|---|
| JP | 2004-100132 A | | 4/2004 |
| JP | 2011-241494 A | * | 12/2011 |
| JP | 2013-049208 A | | 3/2013 |
| JP | 2014-030913 A | | 2/2014 |
| JP | 5512908 B1 | | 4/2014 |
| WO | 2012/105080 A1 | | 8/2012 |
| WO | 2016/043037 A1 | | 3/2016 |
| WO | 2016/104154 A1 | | 6/2016 |
| WO | 2016/136812 A1 | | 9/2016 |
| WO | 2017/006989 A1 | | 1/2017 |

* cited by examiner

PRODUCTION METHOD FOR PARTIALLY SEPARATED FIBER BUNDLE, PARTIALLY SEPARATED FIBER BUNDLE, FIBER-REINFORCED RESIN MOLDING MATERIAL USING PARTIALLY SEPARATED FIBER BUNDLE, AND PRODUCTION METHOD FOR FIBER-REINFORCED RESIN MOLDING MATERIAL USING PARTIALLY SEPARATED FIBER BUNDLE

TECHNICAL FIELD

This disclosure relates to a method of producing a partially separated fiber bundle and a partially separated fiber bundle obtained by the method and, more specifically, to a production method for a partially separated fiber bundle wherein, when performing a specified partial separation processing to a fiber bundle of an inexpensive large tow having a large number of single fibers not expected with separation to form a partially separated fiber bundle with an optimal form to produce a molding material used for molding a composite material, a sizing agent is applied at an appropriate timing (when a sizing agent is applied to an original fiber bundle, an additional sizing agent is applied), and a partially separated fiber bundle obtained by the method, a fiber-reinforced resin molding material impregnated with resin after matting the partially separated fiber bundle, and a production method thereof comprising a series of steps until the material is manufactured.

BACKGROUND

A technology to produce a molded article having a desired shape is known in which a molding material comprising a bundle-like aggregate of discontinuous reinforcing fibers (for example, carbon fibers) (hereinafter, also referred to as a fiber bundle) and a matrix resin is used and it is molded by heating and pressurizing. In such a molding material, a molding material comprising a fiber bundle having a large number of single fibers is excellent in flowability at the time of molding, but tends to be inferior in mechanical properties of a molded article. On the other hand, a fiber bundle adjusted to an arbitrary number of single fibers is used as a fiber bundle in the molding material, aiming to satisfy both the flowability at the time of molding and the mechanical properties of the molded article.

As a method of adjusting the number of single fibers of the fiber bundle, for example, JP-A-2002-255448 and JP-A-2004-100132 disclose methods of performing a separation processing using a plurality of fiber bundle winding bodies prepared by winding a plurality of fiber bundles in advance. In those methods, however, because the number of single fibers of each fiber bundle treated in advance is restricted, the adjustment range is limited and, therefore, it is difficult to adjust to a desired number of single fibers.

Further, for example, JP-A-2013-49208, JP-A-2014-30913 and Japanese Patent No. 5512908 disclose methods of longitudinally slitting a fiber bundle to a desired number of single fibers by using disk-shaped rotary blades. In those methods, although it is possible to adjust the number of single fibers by changing the pitch of the rotary blades, since the fiber bundle longitudinally slit over the entire length in the lengthwise direction has no convergence property, the yarn after the longitudinal slit tends to become difficult in handling such as winding it on a bobbin or unwinding the fiber bundle from the bobbin. In addition, when conveying the fiber bundle after the longitudinal slitting, the split end-like fiber bundle generated by the longitudinal slit may be wrapped around a guide roll, a feed roll or the like, which may not be easy to convey.

Further, WO 2012/105080 discloses a method of cutting a fiber bundle to a predetermined length at the same time as a longitudinal slit by a separation cutter having a lateral blade perpendicular to the fiber direction in addition to a longitudinal blade having a longitudinal slit function in a direction parallel to the fiber direction. According to that method, it becomes unnecessary to once wind the fiber bundle after the longitudinal slit to the bobbin and transport it, and the handling property is improved. However, since the separation cutter has the longitudinal blade and the lateral blade, when one of the blades reaches the cutting life first, an obstacle arises that the entire blade has to be exchanged.

Further, for example, JP-A-2011-241494 and US Patent Publication No. 2012/0213997 A1 describe a method in which a roll having a plurality of projections is provided on the outer circumferential surface of the roll, and the projections of the roll is pushed into a fiber bundle to partially separate the fiber bundle. In that method, however, because the circumferential speed of the roll and the conveying speed of the fiber bundle are basically the same speed synchronized with each other, it is impossible to control the lengths and the like of the separated-processed section and the not-separated-processed section, and it is difficult to obtain a partially separated fiber bundle with an optimal form.

Furthermore, EP-A-2687356 A1 describes a special method of forming intermittently extending flow paths to facilitate resin impregnation in a fiber bundle by a monofilament extending in a direction orthogonal to the fiber bundle. However, this manner relates to a technology of forming a flow path to facilitate resin impregnation in a fiber bundle, and therefore, it is basically a technology different from separation of a fiber bundle such as large tow.

As described above, to satisfy both flowability during molding and mechanical properties of a molded article, a fiber bundle adjusted to an arbitrary optimal number of single fibers is required. Further, even if a fiber bundle of a large tow can be separated into thin fiber bundles having an optimal number of single fibers, there is a possibility that the separated fiber bundles may be reaggregated from some reason and, if reaggregated, it becomes difficult to maintain the form of the fiber bundles adjusted at the optimal number of single fibers. If the form of the fiber bundles adjusted at the optimal number of single fibers cannot be maintained, when making a fiber-reinforced resin molding material obtained by cutting/spraying the separated fiber bundles and impregnating a resin, it becomes difficult to make it into a molding material with an optimal form, and it becomes difficult to exhibit the flowability during molding and the mechanical properties of a molded article at a good balance.

Further, as described above, if the fiber bundle is not separated adequately, when making a fiber-reinforced resin molding material obtained by cutting/spraying the separated fiber bundle and impregnating a resin thereinto, it may become difficult to stably unwind the fiber bundle from a bobbin or the like for cutting and troubles such as winding around a conveyance roller or a cutting blade may occur.

Accordingly, it could be helpful to provide a method of producing a partially separated fiber bundle capable of performing a specified partial separation processing capable of forming a fiber bundle with an optimal number of single fibers of manufacturing a molding material used for molding a composite material, and capable of preventing an inadequate reaggregation and the like from occurring in the produced partially separated fiber bundle and, further, capable of obtaining an excellent process stability and improving a productivity even when subjecting the partially separated fiber bundle to a processing such as cutting.

Further, it could be helpful to provide a fiber-reinforced resin molding material in which the partially separated fiber bundle obtained the above-described production method is matted and impregnated with a resin, and a method of producing a fiber-reinforced resin molding material having a series of steps up to manufacture it.

SUMMARY

We thus provide:
(1) A method of producing a partially separated fiber bundle comprising a partial separation processing step for alternately forming separation-processed sections, each divided into a plurality of bundles, and not-separation-processed sections, wherein, while a fiber bundle comprising a plurality of single fibers is traveled along the lengthwise direction of the fiber bundle, a separation means provided with a plurality of projected parts is penetrated into the fiber bundle to create a separation-processed part, and entangled parts, where the single fibers are interlaced, are formed at contact parts with the projected parts in at least one separation-processed part, thereafter the separation means is removed from the fiber bundle, and after passing through an entanglement accumulation part including the entangled parts, the separation means is penetrated again into the fiber bundle, characterized in that a sizing agent is applied at an arbitrary timing during the production process of the partially separated fiber bundle. When a sizing agent is applied to an original fiber bundle, an additional sizing agent is applied. It is same also in the following methods.
(2) A method of producing a partially separated fiber bundle comprising a partial separation processing step for alternately forming separation-processed sections, each divided into a plurality of bundles, and not-separation-processed sections, wherein a separation means provided with a plurality of projected parts is penetrated into a fiber bundle comprising a plurality of single fibers, while the separation means is traveled along the lengthwise direction of the fiber bundle, a separation-processed part is created, and entangled parts, where the single fibers are interlaced, are formed at contact parts with the projected parts in at least one separation-processed part, thereafter the separation means is removed from the fiber bundle, and after the separation means is traveled up to a position passing through an entanglement accumulation part including the entangled parts, the separation means is penetrated again into the fiber bundle, characterized in that a sizing agent is applied at an arbitrary timing during the production process of the partially separated fiber bundle.
(3) The method of producing a partially separated fiber bundle according to (1) or (2), wherein after widening the width of the fiber bundle, the fiber bundle is supplied to the partial separation processing step.
(4) The method of producing a partially separated fiber bundle according to (3), wherein after applying a sizing agent to the fiber bundle widened in width, the fiber bundle is supplied to the partial separation processing step.
(5) The method of producing a partially separated fiber bundle according to any one of (1) to (4), wherein the application processing of the sizing agent has at least the following steps [1] and [2], and each step is individually performed at an arbitrary timing.

[1] sizing agent applying step
[2] drying step
(6) The method of producing a partially separated fiber bundle according to (5), wherein the width of the fiber bundle before drying is widened through the step [1], the widened fiber bundle is subjected to the step [2], the fiber bundle having undergone the sizing agent application processing and the widening processing is supplied to the partial separation processing step.
(7) A partially separated fiber bundle obtained by the production method according to any one of (1) to (6).
(8) A fiber-reinforced resin molding material comprising a reinforcing fiber mat obtained by cutting and spraying the partially separated fiber bundle according to (7) and a matrix resin.
(9) The fiber-reinforced resin molding material according to (8), wherein the matrix resin is a thermosetting resin.
(10) The fiber-reinforced resin molding material according to (8) or (9) 9, wherein the fiber-reinforced resin molding material is a sheet molding compound.
(11) A method of producing a fiber-reinforced resin molding material according to any one of (8) to (10), comprising at least the following steps [A] to [C]:
 [A] a partial separation step of obtaining a partially separated fiber bundle by alternately forming separation-processed parts, each divided into a plurality of bundles, and not-separation-processed parts along a lengthwise direction of a fiber bundle comprising a plurality of single fibers, and applying a sizing agent at an arbitrary timing during the production process of the partially separated fiber bundle;
 [B] a matting step of cutting the partially separated fiber bundle and spraying the cut bundles to obtain a reinforcing fiber mat; and
 [C] a resin impregnation step of impregnating a matrix resin into the reinforcing fiber mat.
(12) The method of producing a fiber-reinforced resin molding material according to (11), wherein at least the steps [A] to [C] are carried out continuously in a single process.
(13) The method of producing a fiber-reinforced resin molding material according to (11) or (12), wherein in the step [B], the partially separated fiber bundle is cut at an angle $\theta$ ($0<\theta<90°$) with respect to the lengthwise direction thereof.

In the method of producing a partially separated fiber bundle, in the specified production of a partially separated fiber bundle performed with separation while the fiber bundle is traveled or while the separation means is traveled, since a sizing agent is applied at an arbitrary timing during the production process of the partially separated fiber bundle, a reaggregation can be prevented from occurring in the partially separated fiber bundle performed with an optimal partial separation processing, and it becomes possible to maintain the optimal partial separation processing state. As a result, when making a fiber-reinforced resin molding material by cutting/spraying the partially separated fiber bundle maintained at the optimal partial separation processing state and impregnating a resin thereinto, it becomes possible to mix thin fiber bundles and thick fiber bundles within a range of an optimal ratio, thereby exhibiting the flowability during molding and the mechanical properties of a molded article at a good balance.

Further, when cutting the above-described partially separated fiber bundle by, for example, a cutter, an effect of improving unwinding property from a bobbin, or reducing winding around a nip roller or a cutter blade, can be obtained, and it may become possible to improve productivity. Furthermore, it is possible to suppress the collapse of the cut fiber bundle or dispersion at a single fiber level thereof, thereby improving maintenance property at a predetermined bundle form. By this, because the fiber bundles are oriented in a plane direction in a mat sprayed with the cut fiber bundles, the mechanical properties may be further improved.

According to the specific optimal partial separation processing, the fiber bundle can be continuously and stably slit, and the partially separated fiber bundle with the optimal form can be produced easily and efficiently. In particular, even in a fiber bundle containing twist or a fiber bundle of a large tow with a large number of single fibers, it is possible to provide a method of producing a partially separated fiber bundle, enabling a continuous slit processing without worrying about the exchange life of a rotary blade. Furthermore, it becomes possible to process a continuous slitting of an inexpensive large tow, and it also becomes possible to reduce the material cost and the production cost of a molded article.

Further, in the fiber-reinforced resin molding material, because of containing a reinforcing fiber mat obtained by cutting and spraying the above-described partially separated fiber bundle capable of exhibiting the flowability during molding and the mechanical properties of a molded article at a good balance, and a matrix resin, also in molding thin fiber bundles and thick fiber bundles can be mixed at a ratio within an optimal range or at an optimal distribution state, securely the flowability during molding and the mechanical properties of a molded article can be exhibited at a good balance.

Further, in the method of producing a fiber-reinforced resin molding material, it becomes possible to perform a series of steps [A] to [C] continuously in a single process, and a desired fiber-reinforced resin molding material can be produced efficiently and smoothly, in addition, with an excellent productivity.

EXPLANATION OF SYMBOLS

Figure 1:
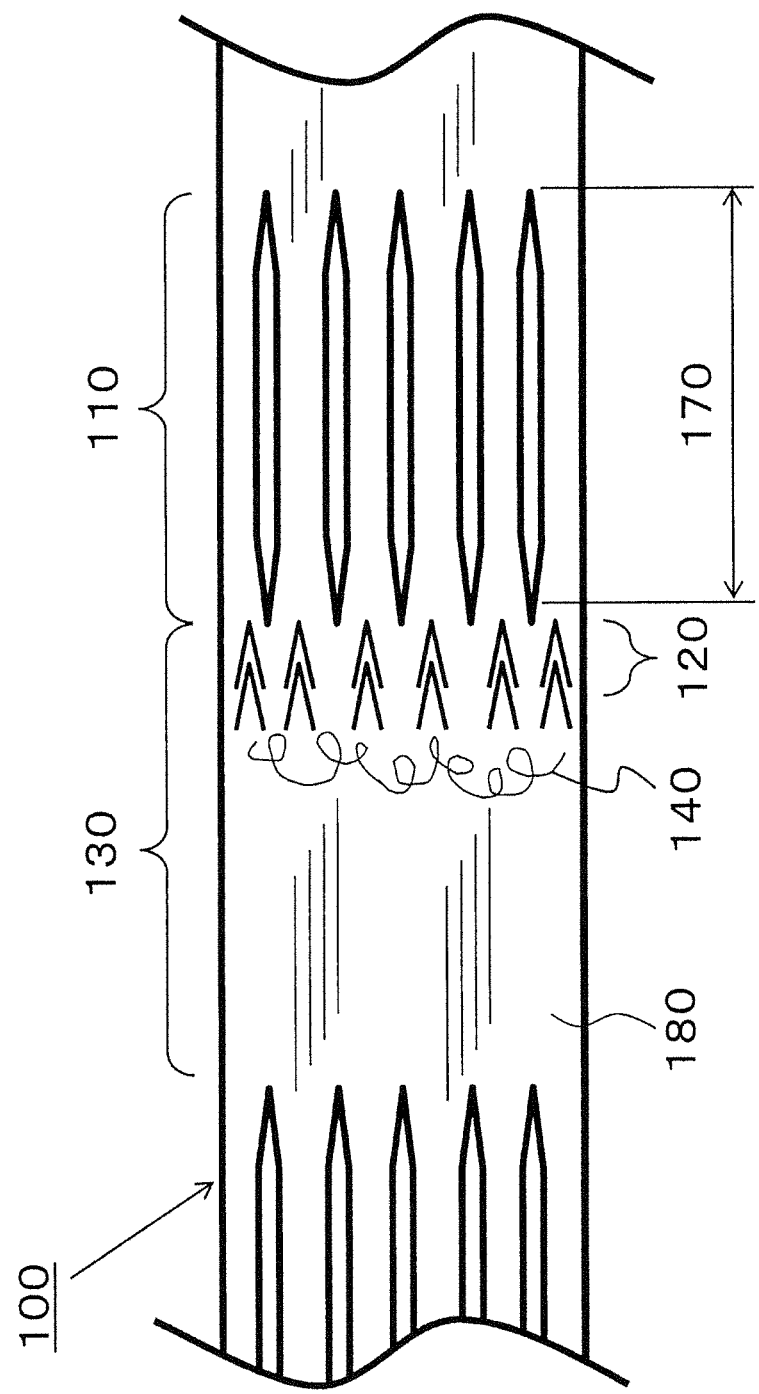
FIG. 1 is a schematic plan view showing an example of a partially separated fiber bundle performed with separation processing to a fiber bundle.

1: process for producing fiber-reinforced resin molding material
2: partial separation step [A]
3: matting step [B]
4: resin impregnation step [C]
5: creel
6: reinforcing fiber bundle
6a: reinforcing fibers
7: partially separated fiber bundle
8: cutter unit
8a: cutting blade
9: spraying mechanism
10: reinforcing fiber mat
11: thermosetting resin
12: film
13: belt
14: resin impregnation roller
15: fiber-reinforced resin molding material
100: fiber bundle
110: separation-processed section
120: entanglement accumulation part
130: not-separation-processed section
140: fluff accumulation
150: separation-processed part
160: entangled part
170: separation distance
180: partially separated fiber bundle
181: not-separation-processed part
200: separation means
210: projected part
211: contact part
220: rotatable separation means
240: rotation shaft
300: partial separation processing step
301: fiber bundle widening step
400: sizing agent application step
401: sizing agent applying step
402: drying step

DETAILED DESCRIPTION

Hereinafter, examples will be explained referring to the figures. This disclosure is not limited in any way to the examples in the drawings.

Figure 2:
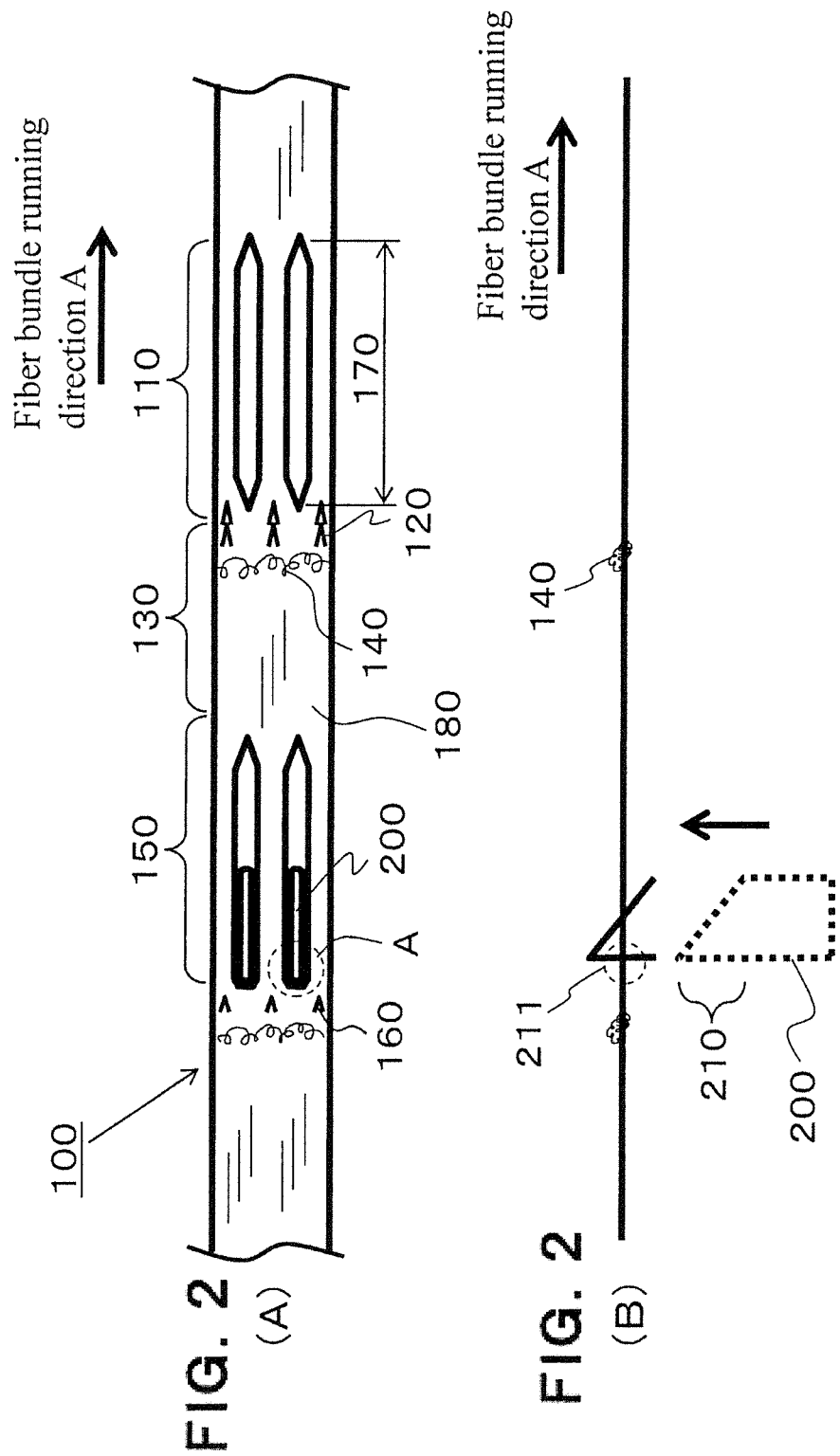
FIGS. 2A and 2B show (A) a schematic plan view and (B) a schematic side view, showing an example in which a separation means is penetrated into a traveling fiber bundle.

First, the method of producing a partially separated fiber bundle will be explained. FIG. 1 shows an example of a partially separated fiber bundle performed with separation processing to a fiber bundle, and FIG. 2 shows an example of the separation processing. A method of producing a partially separated fiber bundle will be explained using FIG. 2. FIG. 2 shows (A) a schematic plan view and (B) a schematic side view, showing an example in which a separation means is penetrated into a traveling fiber bundle. In the figure, a fiber bundle running direction A (arrow) is the lengthwise direction of a fiber bundle 100, which shows that the fiber bundle 100 is continuously supplied from a fiber bundle supply device that is not shown in the figure.

The separation means 200 is provided with a projected part 210 having a projecting shape which is easy to be penetrated into the fiber bundle 100, and which is penetrated into the traveling fiber bundle 100 to create a separation-processed part 150 approximately parallel to the lengthwise direction of the fiber bundle 100. It is preferred that the separation means 200 is penetrated in a direction along the side surface of the fiber bundle 100. The side surface of the fiber bundle means a surface in the vertical direction in a sectional end when the section of the fiber bundle is a flat shape such as a laterally elongated elliptical shape or a laterally elongated rectangular shape (for example, corresponding to the side surface of the fiber bundle 100 shown in FIG. 2). Further, the number of projected parts 210 to be provided may be one for each single separation means 200 or may be plural. When there are a plurality of projected parts 210 in one separation means 200, because the abrasion frequency of the projected part 210 decreases, it becomes possible to reduce the frequency of exchange. Furthermore, it is also possible to simul-taneously use a plurality of separation means 200 depending upon the number of fiber bundles to be separated. It is possible to arbitrarily dispose a plurality of projected parts 210 by arranging a plurality of separation means 200 in parallel, staggeringly, in shifted phases or the like.

When the fiber bundle 100 comprising a plurality of single fibers is divided into separated bundles with a smaller number of fibers by the separation means 200, since the plurality of single fibers are substantially not aligned in the fiber bundle 100 but there are many portions interlaced at the single fiber level, entangled parts 160, in which the single fibers are interlaced in the vicinity of the contact parts 211 during the separation processing, may be formed.

"Forming the entangled part 160" means, for example, a case of forming (moving) the entanglement of single fibers with each other, which has been previously present in the separation-processed section, on the contact part 211 by the separation means 200, forming (producing) an aggregate, in which single fibers are newly interlaced, by the separation means 200, and the like.

After creating the separation-processed part 150 in an arbitrary range, the separation means 200 is removed from the fiber bundle 100. By this removal, a separation-processed section 110 performed with separation processing is created, and at the same time as that, the entangled parts 160 created as described above are accumulated in the end portion of the separation-processed section 110, and an entanglement accumulation part 120 accumulated with the entangled parts 160 is created. Further, fluffs generated from the fiber bundle during the separation processing are formed as a fluff accumulation 140 near the entanglement accumulation part 120 at the time of the separation processing.

Thereafter, by penetrating the separation means 200 into the fiber bundle 100 again, the not-separation-processed section 130 is created and a partially separated fiber bundle 180 is formed in which the separation-processed sections 110 and the not-separation-processed sections 130 are disposed alternately along the lengthwise direction of the fiber bundle 100. In the partially separated fiber bundle 180, it is preferred that the content of the not-separation-processed sections 130 is set to 3% or more and 50% or less. The content of the not-separation-processed sections 130 is defined as the rate of the total generation length of the not-separation-processed sections 130 in a unit length of the fiber bundle 100. If the content of the not-separation-processed sections 130 is less than 3%, the process stability of the separation processing is deteriorated, the flowability, at the time when the partially separated fiber bundle 180 is cut and the cut bundles are sprayed and used as an intermediate base material of fiber bundles of discontinuous fibers, becomes poor, and if the content exceeds 50%, the mechanical properties of a molded article molded using it decrease.

Further, as the length of each section, the length of the separation-processed section 110 is preferably 30 mm or more and 1,500 mm or less, and the length of the not-separation-processed section 130 is preferably 1 mm or more and 150 mm or less.

The running speed of the fiber bundle 100 is preferably a stable speed with little fluctuation, more preferably a constant speed.

The separation means 200 is not particularly limited as long as the desired result can be achieved, and it is preferable to have a shape like a sharp shape such as a metal needle or a thin plate. As the separation means 200, it is preferred that a plurality of separation means 200 are provided in the width direction of the fiber bundle 100 which is performed with the separation processing, and the number of separation means 200 can be arbitrarily selected depending upon the number of single fibers F forming the fiber bundle 100 to be carried out with the separation processing. It is preferred that the number of separation means 200 is (F/10,000−1) or more and less than (F/50−1) with respect to the width direction of the fiber bundle 100. If it is less than (F/10,000−1), improvements in mechanical properties are hardly exhibited when a reinforcing fiber composite material is made in a later step, and if it is (F/50−1) or more, there is a possibility of yarn breakage or fluffing during the separation processing.

The fiber bundle 100 is not particularly limited in fiber kind as long as it is a fiber bundle comprising a plurality of single fibers. In this connection, it is preferred to use reinforcing fibers, and in particular, the kind thereof is preferably at least one selected from the group consisting of carbon fibers, aramide fibers and glass fibers. These may be used solely, or two or more of them can be used together. Among those, carbon fibers are particularly preferable because it is possible to provide a composite material light in weight and excellent in strength. As the carbon fibers, any one of PAN type and pitch type may be used, and the average fiber diameter thereof is preferably 3 to 12 μm, and more preferably 6 to 9 μm.

In carbon fibers, usually, a fiber bundle obtained by bundling about 3,000 to 60,000 single fibers made of continuous fibers is supplied as a wound body (package) wound around a bobbin. Although it is preferred that the fiber bundle is untwisted, it is also possible to use a twisted strand, and it is applicable even if twisting occurs during conveyance. There is no restriction on the number of single fibers, and when a so-called large tow having a large number of single fibers is used, since the price per unit weight of the fiber bundle is inexpensive, as the number of single fibers increases, the cost of the final product can be reduced, and such a condition is preferred. Further, as a large tow, a so-called doubling form in which fiber bundles are wound together in a form of one bundle may be employed.

When reinforcing fibers are used, it is preferred that they are surface treated for the purpose of improving the adhesive property with a matrix resin used when made to a reinforcing fiber composite material. As the method for the surface treatment, there are an electrolytic treatment, an ozone treatment, a ultraviolet treatment and the like. Further, a sizing agent may be applied for the purpose of preventing fluffing of the reinforcing fibers, improving convergence property of the reinforcing fiber strand, improving adhesive property with the matrix resin and the like. However, this application of the sizing agent is performed at a step different from the sizing agent application performed at an arbitrary timing in the production process of the partially separated fiber bundle, that is described later. As the sizing agent, though not particularly limited, a compound having a functional group such as an epoxy group, a urethane group, an amino group, a carboxyl group or the like can be used, and as such a compound, one type or a combination of two or more types may be used. Also with respect to the sizing agent applied at an arbitrary timing in the production process of the partially separated fiber bundle, that is described later, similar one can be used.

The fiber bundle is preferably in a state of being bundled in advance. "The state being bundled in advance" indicates, for example, a state in which the single fibers forming the fiber bundle are bundled by entanglement with each other, a state in which the fibers are converged by a sizing agent applied to the fiber bundle, or a state in which the fibers are converged by twist generated in a process of manufacturing the fiber bundle.

Figure 3:
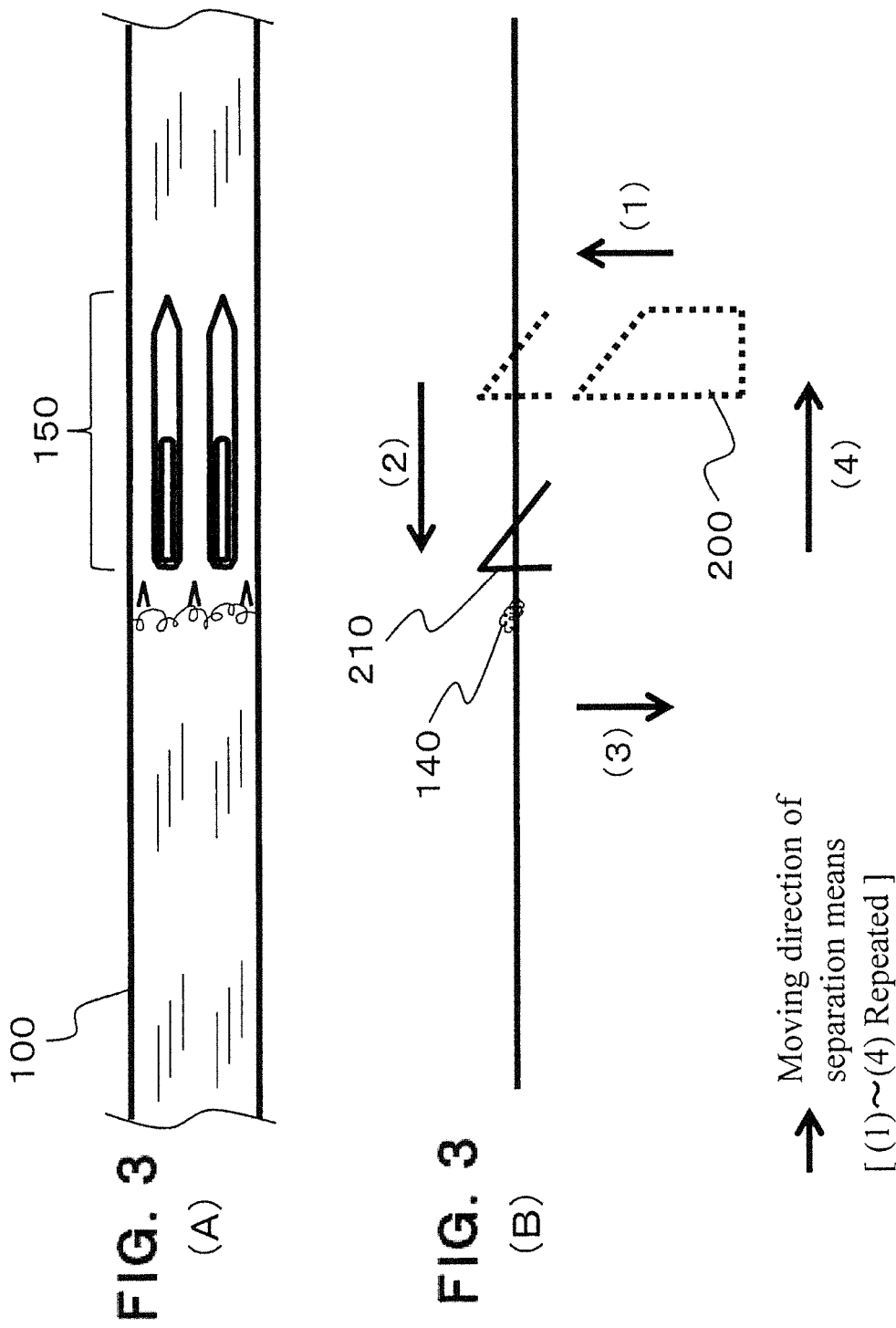
FIGS. 3A and 3B show (A) a schematic plan view and (B) a schematic side view, showing an example of a movement cycle in which a moving separation means is penetrated into a fiber bundle.

Our methods are not limited to when the fiber bundle travels, and as shown in FIG. 3, a method may be also employed wherein the separation means 200 is penetrated into the fiber bundle 100 being in a stationary state (arrow (1)), then, while the separation means 200 is traveled along the fiber bundle 100 (arrow (2)), the separation-processed part 150 is created, and thereafter, the separation means 200 is removed (arrow (3)). Thereafter, as shown in FIG. 4(A), the separation means 200 may be returned to the original position (arrow (4)) after the fiber bundle 100 having been in a stationary state is moved by a constant distance at timings shown by arrows (3) and (4), or as shown in FIG. 4(B), without moving the fiber bundle 100, the separation means 200 may be traveled until it passes through the entanglement accumulation part 120 (arrow (4)).

Figure 4:
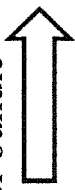
FIGS. 4A and 4B show schematic explanatory views showing another example of a movement cycle in which a moving separation means is penetrated into a fiber bundle.

When the fiber bundle 100 is subjected to separation processing while it is moved by a constant distance, as shown in FIG. 3(B) or FIG. 4(A), the control is performed in a method preferably so that a separation processing time during being penetrated with the separation means 200 (the time of operation indicated by arrow (2)) and a time from being removed with the separation means 200 to being penetrated again into the fiber bundle (the time of operation indicated by arrows (3), (4) and (1)) are controlled. In this example, the moving direction of the separation means 200 is the repetition of (1) to (4) in the figure.

Further, when the fiber bundle 100 is not moved and the separation processing is performed while moving the separation means 200 until the separation means 200 passes through the entanglement accumulation part 120, as shown in FIG. 4(B), the control is performed in another method preferably so that a separation processing time during being penetrated with the separation means 200 (the time of operation indicated by arrow (2) or arrow (6)) and a time from being removed with the separation means 200 to being penetrated again into the fiber bundle (the time of operation indicated by arrows (3), (4) and (5) or by arrows (3), (4) and (1)) are controlled. Also in this example, the moving direction of the separation means 200 is the repetition of (1) to (4) in the figure.

Thus, by the separation means 200, the separation-processed sections and the not-separated-processed sections are alternatively formed, and a partially separated fiber bundle is produced so that the not-separation-processed sections have a ratio within a predetermined range with respect to the unit length of the fiber bundle.

Depending upon the entanglement state of single fibers forming the fiber bundle 100, without securing a not-separation-processed section having an arbitrary length (for example, in FIG. 2, after creating the separation-processed section 110, creating a next separation-processed part 150 with securing a not-separation-processed section 130 having a constant length), it is possible to restart separation processing subsequently from the vicinity of the terminal end portion of the separation-processed section. For example, as shown in FIG. 4(A), when the separation processing is performed while intermittently moving the fiber bundle 100, after the separation means 200 performs the separation processing (arrow (2)), by setting the moving length of the fiber bundle 100 to be shorter than the length of the separation processing performed immediately before, the position (arrow (1)) where the separation means 200 is to be penetrated once again can be overlapped with the separation-processed section performed with the separation processing immediately before. On the other hand, as shown in FIG. 4(B), in carrying out the separation processing while moving the separation means 200 itself, after once removing the separation means 200 (arrow (3)), without moving it at a constant length (arrow (4)), the separation means 200 can be penetrated into the fiber bundle again (arrow (5)).

In such a separation processing, when a plurality of single fibers forming the fiber bundle 100 are interlaced with each other, since the single fibers are not substantially aligned in the fiber bundle, even if the separation means 200 is penetrated at the same position as the position where the separation processing has been already performed or as the position where the separation means 200 has been removed, in the width direction of the fiber bundle 100, the position to be penetrated is easily shifted with respect to the single fiber level, and the separation processed state (gap) is not continued from the separation-processed section formed immediately before and they can exist as separation-processed sections different from each other.

The length of the separation-processed section obtained per one separation processing (separation distance 170) is preferably 30 mm or more and less than 1,500 mm, although it depends upon the entanglement state of single fibers of the fiber bundle performed with the separation processing. If it is less than 30 mm, the effect according to the separation processing is insufficient, and if it is 1,500 mm or more, depending upon the reinforcing fiber bundle, there is a possibility of occurrence of yarn breakage or fluffing.

Further, when a plurality of separation means 200 are provided, it is also possible to provide a plurality of alternately formed separation-processed sections and not-separation-processed sections approximately parallel to each other with respect to the width direction of the fiber bundle. In this example, as aforementioned, it is possible to arbitrarily dispose a plurality of projected parts 210 by arranging a plurality of separation means 200 in parallel, staggeringly, in shifted phases or the like.

Furthermore, each of the plurality of projected parts 210 can also be controlled independently. Although the details will be described later, it is also preferred that the individual projected parts 210 independently perform separation processing by the time required for the separation processing or the pressing force detected by the projected part 210.

The fiber bundle is unwound from an unwinding device (not shown) or the like disposed on the upstream side in the fiber bundle traveling direction for unwinding the fiber bundle. As the unwinding direction of the fiber bundle, although a laterally unwinding system for pulling out in a direction perpendicular to the axis of rotation of a bobbin and a longitudinally unwinding system for pulling out in the same direction as the axis of rotation of the bobbin (paper tube) are considered, the laterally unwinding system is preferred in consideration that in that system there are few unwinding twists.

Further, with respect to the installation posture of the bobbin at the time of unwinding, it can be installed in an arbitrary direction. In particular, when, in a state where the bobbin is pierced through the creel, the end surface of the bobbin on the side not being the creel rotation shaft fixed surface is directed in a direction other than the horizontal direction, it is preferred that the fiber bundle is held in a state where a constant tension is applied to the fiber bundle. When there is no constant tension in the fiber bundle, it is considered that the fiber bundle falls from and is separated from a package (a winding body in which the fiber bundle is wound on the bobbin), or that a fiber bundle separated from the package winds around the creel rotation shaft, whereby unwinding becomes difficult.

Further, as a method of fixing the rotation shaft of the unwound package, in addition to the method of using a creel, a surface unwinding method is also applicable wherein a package is placed on two rollers arranged in parallel with each other at a state in parallel with the two parallel rollers, and the package is rolled on the arranged rollers to unwind a fiber bundle.

Further, in unwinding using a creel, a method of applying a tension to the unwound fiber bundle by applying a brake to the creel by putting a belt around the creel, fixing one end of the belt, and hanging the weight or pulling with a spring at the other end or the like, is considered. In this example, varying the braking force depending upon the winding diameter is effective as means for stabilizing the tension.

Furthermore, to adjust the number of single fibers after separation processing, a method of widening the fiber bundle and a method for adjustment by a pitch of a plurality of separation means arranged in the width direction of the fiber bundle can be employed. By making the pitch of the separation means smaller and providing a larger number of separation means in the width direction of the fiber bundle, it becomes possible to perform a so-called thin bundle separation processing into thin bundles each having fewer single fibers. Further, it is also possible to adjust the number of single fibers even by widening the fiber bundle before separation processing and applying separation processing to the widened fiber bundle with a larger number of separation means without narrowing the pitch of the separation means.

The term "widening" means a processing of expanding the width of the fiber bundle 100. The widening method is not particularly restricted, and it is preferred to use a vibration widening method of passing through a vibration roll, an air widening method of blowing compressed air, or the like.

The separation-processed part 150 is formed by repeating penetration and removal of the separation means 200. At that time, it is preferred to set the timing of penetrating again by the time passed after removing the separation means 200. Further, also it is preferred to set the timing of removing again by the time passed after penetrating the separation means 200. By setting the timing of penetrating and/or removing by time, it becomes possible to create the separation-processed section 110 and the not-separation-processed section 130 at predetermined distance intervals, and it also becomes possible to arbitrarily determine the ratio between the separation-processed section 110 and the not-separation-processed section 130. Further, although the predetermined time intervals may be always the same, it is also possible to change the intervals in accordance with circumstances such as increasing or shortening the intervals depending upon the distance at which the separation processing has been progressed, or changing the intervals depending upon the state of the fiber bundle at respective times, for example, shortening the predetermined time intervals in case where there is little fluffing or entanglement of single fibers in the original fiber bundle or the like.

When the separation means 200 is penetrated into the fiber bundle 100, since the created entangled part 160 continues to press the projected part 210 in accordance with the progress of the separation processing, the separation means 200 receives a pressing force from the entangled part 160.

As aforementioned, a plurality of single fibers are not substantially aligned in the fiber bundle 100 but in most portions they are interlaced with each other at the single fiber level and, further, in the lengthwise direction of the fiber bundle 100, there is a possibility where there exist a portion with many entanglements and a portion with few entanglements. In the portion with many entanglements of single fibers, the rise of the pressing force at the time of separation processing becomes fast and, conversely, in the portion with few entanglements of single fibers, the rise of the pressing force becomes slow. Therefore, it is preferred that the separation means 200 is provided with a pressing force detection means for detecting a pressing force from the fiber bundle 100.

Further, since the tension of the fiber bundle 100 may change before and after the separation means 200, at least one tension detection means for detecting the tension of the fiber bundle 100 may be provided in the vicinity of the separation means 200, or a plurality of them may be provided and a difference in tension may be calculated. These means for detecting the pressing force, the tension and the tension difference may be provided individually, or may be provided in a form of any combination thereof. The tension detection means for detecting the tension is disposed preferably 10 to 1,000 mm apart from the separation means 200 in at least one of the front and rear of the fiber bundle 100 along the lengthwise direction of the fiber bundle 100.

It is preferred that the removal of the separation means 200 is controlled in accordance with each detected value of these pressing force, tension and tension difference. It is further preferred to control removing the separation means 200 when the detected value exceeds an arbitrarily set upper limit value accompanying with the rise of the detected value. In the pressing force and the tension, it is preferred to set the upper limit value to 0.01 to 1 N/mm, and in the tension difference to 0.01 to 0.8 N/mm. The upper limit value may be varied within a range of ±10% depending upon the state of the fiber bundle. The unit (N/mm) of the pressing force, the tension and the tension difference indicates force acting per the width of the fiber bundle 100.

If lowering than the range of the upper limit value of the pressing force, the tension or the tension difference, because immediately after penetrating the separation means 200 the pressing force, the tension or the tension difference reaches a value to be removed with the separation means 200, a sufficient separation processing distance cannot be obtained, the separation-processed section 110 becomes too short and, therefore, the fiber bundle performed with separation processing tried to be obtained cannot be obtained. On the other hand, if exceeding the range of the upper limit value, because after penetrating the separation means 200 cutting of the single fibers in the fiber bundle 100 increases before the pressing force, the tension or the tension difference reaches a value to be removed with the separation means 200, defects such as projecting of the fiber bundle having been performed with separation processing in a shape like a split end or increase of generated fluffs, are likely to occur. The projected split end may be wrapped around a roll being served to the conveyance, or the fluffs are accumulated on a drive roll to cause slipping in the fiber bundle, and the like, and thus, a conveyance failure tends to be caused.

Different from when the timing of removal of the separation means 200 is controlled with time, in detecting the pressing force, the tension and the tension difference, because the separation means 200 is removed before a force enough to cut the fiber bundle 100 is applied during the separation processing, an unreasonable force is not applied to the fiber bundle 100, and continuous separation processing becomes possible.

Furthermore, to obtain the fiber bundle 100 which has a long separation-processed section 110 and a stable shape of the entanglement accumulation part 120 in the lengthwise direction, while suppressing the occurrence of branching or fluffing like a partial cutting of the fiber bundle 100, it is preferred that the pressing force is controlled to 0.04 to 0.4 N/mm, the tension is controlled to 0.02 to 0.2 N/mm, and the tension difference is controlled to 0.05 to 0.5 N/mm.

It is also preferred to provide an imaging means for detecting the presence of a twist of the fiber bundle 100 at 10 to 1,000 mm in at least one of the front and rear of the fiber bundle 100 along the lengthwise direction of the fiber bundle 100 from the separation means 200 having been penetrated into the fiber bundle 100. By this imaging, the position of the twist is specified beforehand, and it is controlled to not penetrate the separation means 200 into the twist, thereby making it possible to prevent a mistake in penetration. Further, by removing the separation means 200 when the twist approaches the penetrated separation means 200, that is, by controlling to not penetrate the separation means 200 into the twist, it is possible to prevent narrowing in width of the fiber bundle 100. A mistake in penetration means that the separation means 200 is penetrated into the twist, the fiber bundle 100 is only pushed and moved in the penetrating direction of the separation means 200, and the separation processing is not performed.

In a configuration in which a plurality of separation means 200 are present in the width direction of the fiber bundle 100 and are arranged at equal intervals, if the width of the fiber bundle 100 varies, because the number of single fibers having been performed with separation processing also varies, there is a possibility that a separation processing with a stable number of single fibers cannot be performed. Further, if the twist is forcibly performed with separation processing, because the fiber bundle 100 is cut at the single fiber level to generate a large amount of fluffs, the shape of the entanglement accumulation part 120 in which the entangled parts 160 are accumulated becomes large. If the large entanglement accumulation part 120 is left, it is easily caught by the fiber bundle 100 unwound from the roll.

When the twist of the fiber bundle 100 is detected, other than the above-described control to not penetrate the separation means 200 into the twist, the traveling speed of the fiber bundle 100 may be changed. Concretely, after the twist is detected, the traveling speed of the fiber bundle 100 is increased at the timing when the separation means 200 is being removed from the fiber bundle 100 until the twist passes through the separation means 200, thereby efficiently avoiding the twist.

Further, an image calculation processing means for calculating the image obtained by the imaging means may be further provided, and a pressing force control means for controlling the pressing force of the separation means 200 based on the calculation result of the image calculation processing means may be further provided. For example, when the image calculation processing means detects a twist, it is possible to improve the passing ability of the twist when the separation means passes the twist. Concretely, it is preferred to detect the twist by the imaging means and to control the separation means 200 so that the pressing force is decreased from just before the projected part 210 comes into contact with the detected twist to the time when the projected part 210 passes therethrough. When the twist is detected, it is preferred to reduce it to 0.01 to 0.8 time the upper limit value of the pressing force. When it is below this range, substantially the pressing force cannot be detected, it becomes difficult to control the pressing force, or it becomes necessary to enhance the detection accuracy of the control device itself. Further, when it exceeds this range, the frequency of the separation processing performed to the twist is increased and the fiber bundle becomes narrow.

Figure 5:
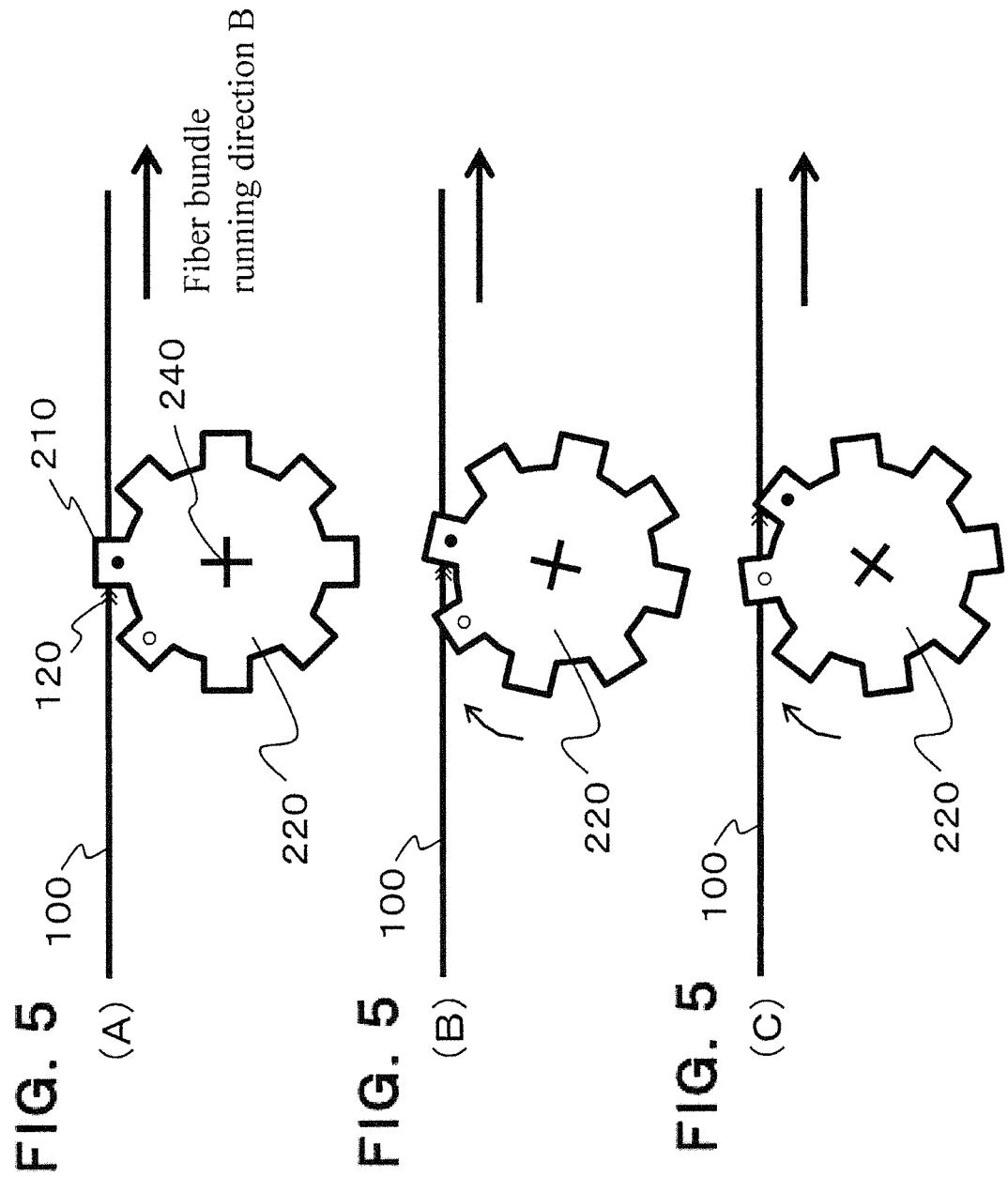
FIGS. 5A-5C are is explanatory diagrams showing an example of a movement cycle in which a rotatable separation means is penetrated.

It is also preferred to use a rotatable separation means 220 rotatable as the separation means other than simply penetrating the separation means 200 having the projected part 210 into the fiber bundle 100. FIG. 5 is an explanatory view showing an example of a movement cycle in which a rotatable separation means is penetrated. The rotatable separation means 220 has a rotation mechanism having a rotation axis 240 orthogonal to the lengthwise direction of the fiber bundle 100, and the projected part 210 is provided on the surface of the rotation shaft 240. As the fiber bundle 100 travels along the fiber bundle running direction B (arrow) in the figure, the projected parts 210 provided in the rotatable separation means 220 are penetrated into the fiber bundle 100 and the separation processing is started. Although omitted in the figure, it is preferred that the rotatable separation means 220 has a pressing force detection mechanism and a rotation stop position holding mechanism. Until a predetermined pressing force acts on the rotatable separation means 220 by the both mechanisms, the rotation stop position is maintained at the position shown in FIG. 5(A) and the separation processing is continued. When exceeding the predetermined pressing force, for example, when an entangled part 160 is caused at the position of the projected part 210, the rotatable separation means 220 starts to rotate as shown in FIG. 5(B). Thereafter, as shown in FIG. 5(C), the projected part 210 (black circle mark) is removed from the fiber bundle 100, and the next projected part 210 (white circle mark) is penetrated into the fiber bundle 100. The shorter the operation shown in FIGS. 5(A) to 5(C) is, the shorter the not-separation-processed section becomes and, therefore, in case where it is attempted to increase the proportion of separation-processed sections, it is preferred to shorten the operation shown in FIGS. 5(A) to 5(C).

By arranging the projected parts 210 more in the rotatable separation means 220, it is possible to obtain a fiber bundle 100 with a high proportion of separation processing and to extend the life of the rotatable separation means 220. A fiber bundle with a high proportion of separation processing means a fiber bundle obtained by lengthening the separation-processed length within the fiber bundle, or a fiber bundle in which the frequency of occurrence of the separation-processed sections and the not-separation-processed sections is increased. Further, as the number of the projected parts 210 provided in one rotatable separation means increases, the lifetime can be lengthened by reducing the frequency of contact of the projected parts 210 with the fiber bundle 100 and wear of the projected parts 210. As for the number of projected parts 210 to be provided, it is preferred to arrange 3 to 12 pieces at equal intervals on the disk-shaped outer edge, more preferably 4 to 8 pieces.

Thus, when attempting to obtain a fiber bundle 100 with a stable fiber bundle width while giving priority to the proportion of separation processing and the life of the projected parts, it is preferred that the rotatable separation means 220 has an imaging means for detecting a twist. Concretely, during normal operation until the imaging means detects the twist, the rotatable separation means 220 intermittently repeats the rotation and the stop to perform the separation processing, and when the twist is detected, the rotational speed of the rotatable separation means 220 is increased from the speed at the normal time and/or the stop time is shortened, thereby stabilizing the fiber bundle width.

It is also possible to control the stop time to zero, that is, to continue the rotation without stopping.

Further, other than the method of repeating the intermittent rotation and stopping of the rotatable separation means 220, the rotatable separation means 220 may always continue to rotate. At that time, it is preferred to make either one of the traveling speed of the fiber bundle 100 and the rotational speed of the rotatable separation means 220 relatively faster or slower. When the speeds are the same, although separation-processed sections can be formed because the operation of penetrating/removing the projected part 210 into/from the fiber bundle 100 is performed, since the separation processing operation acting on the fiber bundle 100 is weak, there is a possibility that the separation processing is not be performed sufficiently. Further, when any one of the speeds is too fast or too slow, the number of times the fiber bundle 100 and the projected parts 210 come in contact with each other increases, there is a possibility that yarn breakage may occur due to rubbing, which causes to be inferior in continuous productivity.

A reciprocating movement mechanism of performing penetrating and removing of the separation means 200 or the rotatable separation means 220 by reciprocating movement of the separation means 200 or the rotatable separation means 220 may be further provided. Further, it is also preferred to further provide a reciprocating movement mechanism to reciprocate the separation means 200 and the rotatable separation means 220 along the feed direction of the fiber bundle 100. For the reciprocating movement mechanism, it is possible to use a linear motion actuator such as a compressed-air or electric cylinder or slider.

The number of separation-processed sections in using reinforcing fibers for fiber bundles is preferably at least (F/10,000–1) or more and less than (F/50–1) in a certain region in the width direction. F is the total number of single fibers forming the fiber bundle to be performed with separation processing. By providing the separation-processed sections controlled in number thereof at least at (F/10,000–1) or more in a certain region in the width direction, when the partially separated fiber bundle is cut to a predetermined length to be made into a discontinuous fiber reinforced composite material, because the end portion of the reinforcing fiber bundle in the discontinuous fiber reinforced composite material is finely divided, a discontinuous fiber reinforced composite material having excellent mechanical properties can be obtained. Further, when the partially separated fiber bundle is used as continuous fibers without cutting it, when a reinforcing fiber composite material is made by impregnating a resin or the like thereinto in a later process, a starting point for resin impregnation into the reinforcing fiber bundle is made from a region included with many separation-processed sections, the molding time can be shortened and voids and the like in the reinforcing fiber composite material can be reduced. By controlling the number of separation-processed sections to less than (F/50–1), the obtained partially separated fiber bundle becomes hard to cause yarn breakage, and the decrease of mechanical properties when made into a fiber-reinforced composite material can be suppressed.

If the separation-processed sections are provided with periodicity or regularity in the lengthwise direction of the fiber bundle 100, when the partially separated fiber bundle is cut to a predetermined length in a later process to make discontinuous fibers, it is possible to easily control to a predetermined number of separated fiber bundles.

Next, in the production of a specified partially separated fiber bundle, performed with the above-described specified optimal partial separation processing, application of a sizing agent performed at an arbitrary timing in the production process of the partially separated fiber bundle will be explained.

The means of applying a sizing agent is not particularly limited, and any known means can be used. For example, it is commonly carried out that a sizing treatment liquid in which a sizing agent is dissolved (including dispersed) in a solvent (including a dispersion medium in case of dispersing) is prepared, and after the sizing treatment liquid is applied to a fiber bundle, by drying, vaporizing and removing the solvent, the sizing agent is applied to the fiber bundle. As described later in detail, a partial separation processing or a fiber bundle widening processing may be performed between this applying step and the drying step.

As a method of applying a sizing treatment liquid to the fiber bundle, for example, there are a method of immersing the fiber bundle in a sizing treatment liquid through a roller, a method of contacting the fiber bundle to a roller attached with a sizing treatment liquid, a method of making a sizing treatment liquid into a mist state and blowing it on the fiber bundle and the like. In this example, it is preferred to control sizing treatment liquid concentration, temperature, thread tension and the like so that the adhesion amount of the sizing agent effective ingredient to the fiber bundle uniformly adheres within a proper range. Further, it is more preferred to excite the fiber bundle with ultrasonic waves at the time of sizing agent application.

Although the adhesion amount of the sizing agent is not particularly limited, the sizing agent is preferably 0.01 to 10% by weight in 100% by weight of the fiber bundle after sizing agent application. When a sizing agent is applied to an original fiber bundle, it is preferred that the total adhesion amount of sizing agent is within the above-described range.

Further, although the drying temperature and the drying time should be adjusted depending upon the ingredients and the adhesion amount of the sizing agent, it is preferred to shorten the time required for complete removal and drying of the solvent used for the sizing agent application, and from the viewpoint of preventing thermal degradation of the sizing agent, to control the drying temperature preferably at 150° C. or more and 350° C. or less, and more preferably at 180° C. or more and 250° C. or less.

Next, the timing of the sizing agent application will be explained in detail.

Figure 6:
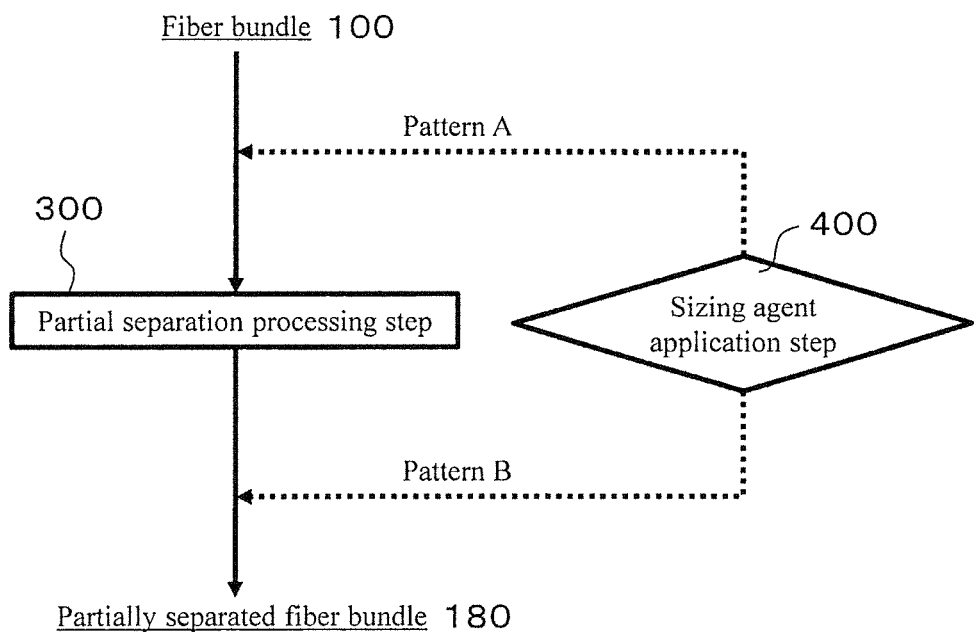
FIG. 6 is a process chart showing an example of a timing of a sizing agent application step in the method of producing a partially separated fiber bundle.

FIG. 6 shows a timing example of a sizing agent application step in the production process of the partially separated fiber bundle in the method of producing the partially separated fiber bundle. In FIG. 6, in the process in which the fiber bundle 100 is formed into the partially separated fiber bundle 180 through the partial separation processing step 300, a pattern A in which the sizing agent application step 400 is carried out before the partial separation processing step 300 and a pattern B in which it is carried out after the partial separation processing step 300 are shown. Any timing of either pattern A or pattern B is possible.

Figure 7:
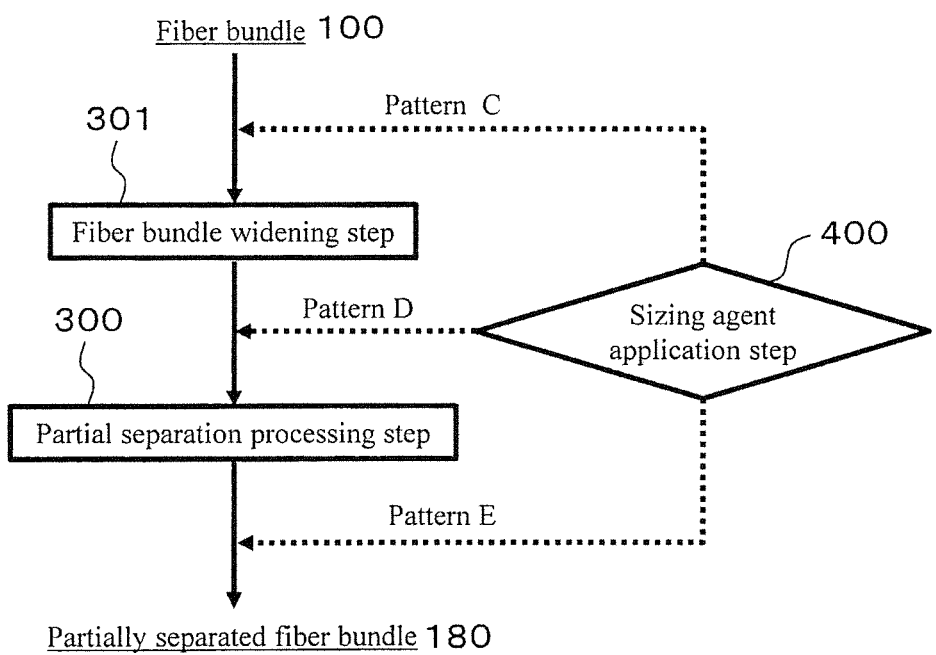
FIG. 7 is a process chart showing an example of a timing of a sizing agent application step in the method of producing a partially separated fiber bundle including a fiber bundle widening step.

FIG. 7 shows a timing example of the sizing agent application step 400 in the production process of the partially separated fiber bundle in the method for producing the partially separated fiber bundle including a fiber bundle widening step 301. In FIG. 7, in the process in which the fiber bundle 100 is formed into the partially separated fiber bundle 180 through the fiber bundle widening step 301 and the partial separation processing step 300 in this order, a pattern C in which the sizing agent application step 400 is carried out before the fiber bundle widening step 301, a pattern D in which it is carried out between the fiber bundle widening step 301 and the partial separation processing step 300, and a pattern E in which it is carried out after the partial separation processing step 300, are shown. Although any timing of pattern C, pattern D and pattern E is possible, the timing of pattern D is most preferable from the viewpoint that optimal partial separation processing can be achieved.

Figure 8:
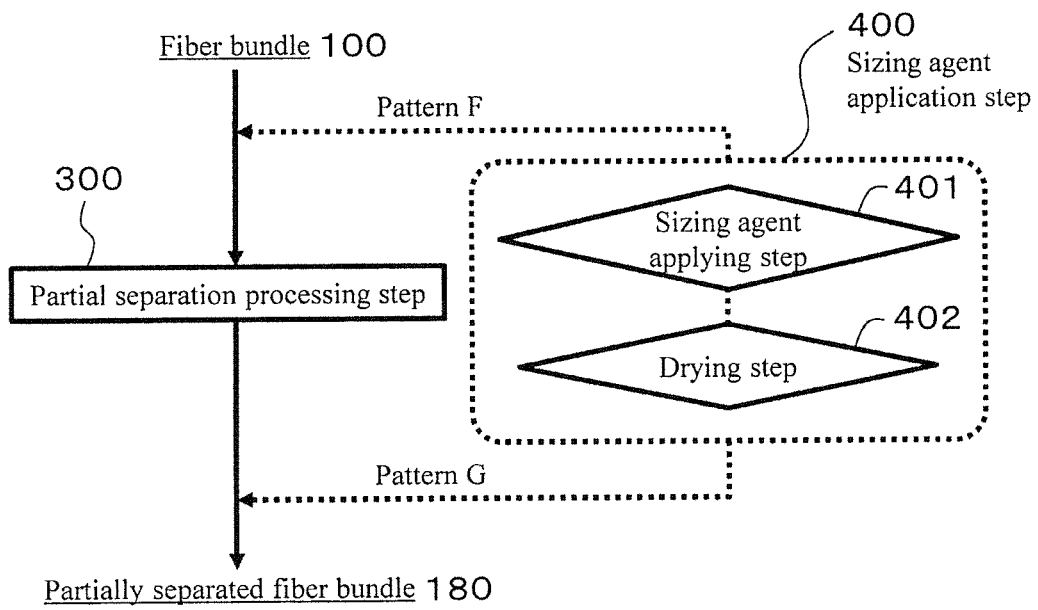
FIG. 8 is a process chart showing an example of a timing of a sizing agent application step including a sizing agent applying step and a drying step in the method for producing a partially separated fiber bundle.

FIG. 8 shows a timing example of a sizing agent application step including a sizing agent applying step and a drying step in the production process of the partially separated fiber bundle in the method for producing the partially separated fiber bundle. The sizing agent application step 400 includes a sizing agent applying step 401 and a drying step 402, and in FIG. 8, in the process in which the fiber bundle 100 is formed into the partially separated fiber bundle 180 through the partial separation processing step 300, a pattern F in which the sizing agent application step 400 including these sizing agent applying step 401 and drying step 402 is carried out before the partial separation processing step 300 and a pattern G in which it is carried out after the partial separation processing step 300 are shown. Any timing of either pattern F or pattern G is possible. The pattern G is substantially the same as the pattern B in FIG. 6.

Figure 9:
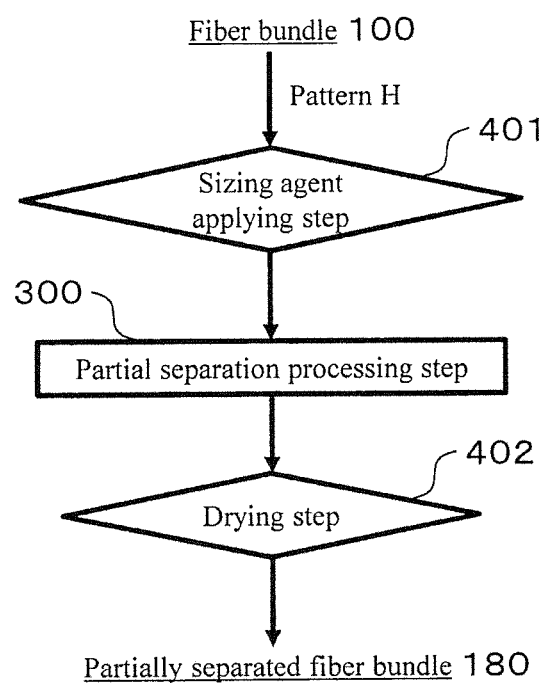
FIG. 9 is a process chart showing another example of a timing of a sizing agent application step including a sizing agent applying step and a drying step in the method for producing a partially separated fiber bundle.

FIG. 9 shows another timing example of a sizing agent application step including a sizing agent applying step and a drying step in the production process of the partially separated fiber bundle in the method of producing the partially separated fiber bundle. In the pattern H in the timing example shown in FIG. 9, the sizing agent applying step 401 and the drying step 402 in the sizing agent application step 400 are separated and performed at different timings. The sizing agent applying step 401 is performed before the partial separation processing step 300 and the drying step 402 is performed after the partial separation processing step 300.

Figure 10:
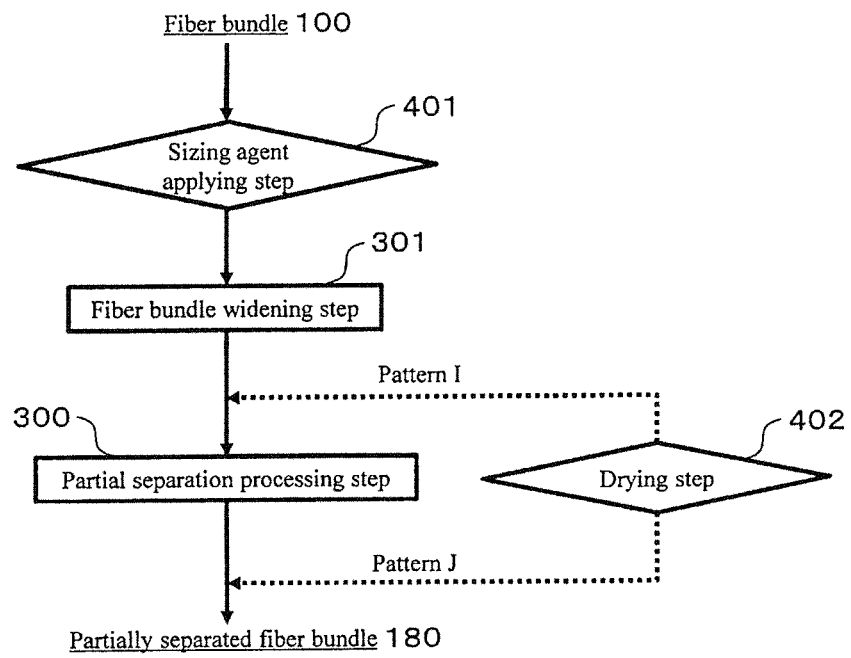
FIG. 10 is a process chart showing an example of a timing of a sizing agent application step including a sizing agent applying step and a drying step in the method for producing a partially separated fiber bundle including a fiber bundle widening step.

FIG. 10 shows a timing example of a sizing agent application step including a sizing agent applying step and a drying step in the method of producing the partially separated fiber bundle including a fiber bundle widening step. In the process in which the fiber bundle 100 is formed into the partially separated fiber bundle 180 through the fiber bundle widening step 301 and the partial separation processing step 300 in this order, the sizing agent applying step 401 of the sizing agent application step is performed before the fiber bundle widening step 301, and with respect to the drying step 402, a pattern I in which it is carried out between the fiber bundle widening step 301 and the partial separation processing step 300 and a pattern J in which it is carried out after the partial separation processing step 300 are shown.

Figure 11:
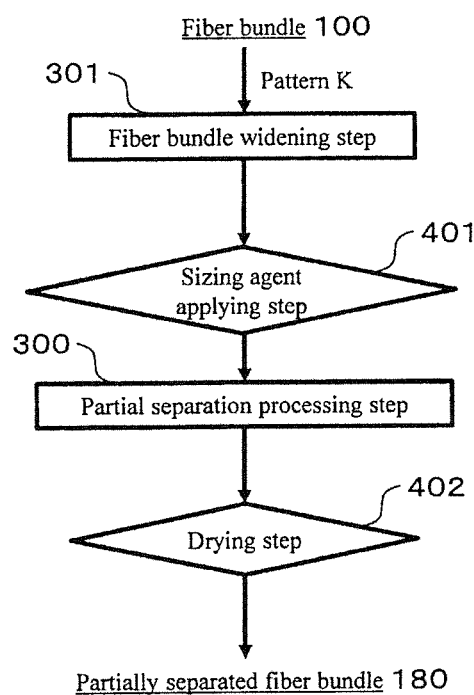
FIG. 11 is a process chart showing another example of a timing of a sizing agent application step including a sizing agent applying step and a drying step in the method for producing a partially separated fiber bundle including a fiber bundle widening step.

FIG. 11 shows another timing example of a sizing agent application step including a sizing agent applying step and a drying step in the method of producing the partially separated fiber bundle including a fiber bundle widening step. In the process in which the fiber bundle 100 is formed into the partially separated fiber bundle 180 through the fiber bundle widening step 301 and the partial separation processing step 300 in this order, a pattern K is shown in which the sizing agent applying step 401 of the sizing agent application step is performed between the fiber bundle widening step 301 and the partial separation processing step 300, and the drying step 402 is performed after the partial separation processing step 300.

Thus, in the method of producing a partially separated fiber bundle, it is possible to apply a sizing agent at various timings.

Next, the fiber-reinforced resin molding material will be explained.

The fiber-reinforced resin molding material contains a reinforcing fiber mat obtained by cutting/spraying the above-described partially separated fiber bundle and a matrix resin.

The average fiber length of the cut-off partially separated fiber bundle is preferably 5 to 100 mm, and more preferably 10 to 80 mm. The distribution of the fiber length may be a distribution of a single-kind fiber length or a mixture of two or more kinds.

Further, the matrix resin is not particularly restricted, and any of a thermosetting resin and a thermoplastic resin can be used, and it can be appropriately selected within a range that does not greatly deteriorate the mechanical properties as a molded article. For example, in a thermosetting resin, a vinyl ester resin, an epoxy resin, an unsaturated polyester resin, a phenol resin, an epoxy acrylate resin, a urethane acrylate resin, a phenoxy resin, an alkyd resin, a urethane resin, a maleimide resin, a cyanate resin or the like can be used. Among them, any one of vinyl ester resin, epoxy resin, unsaturated polyester resin, phenol resin, or a mixture thereof is preferred. Further, in a thermoplastic resin, polyolefin-based resins such as polyethylene resin and polypropylene resin, polyamide-based resins such as nylon 6 resin and nylon 6,6 resin, polyester-based resins such as polyethylene terephthalate resin and polybutylene terephthalate resin, a polyphenylene sulfide resin, a polyether ketone resin, a polyether sulfone resin, an aromatic polyamide resin or the like can be used. Among them, any one of a polyamide resin, a polypropylene resin and a polyphenylene sulfide resin is preferred. A thermosetting resin can be used more preferably from the viewpoint of impregnating property of the matrix resin and applicability to the impregnating step.

Figure 12:
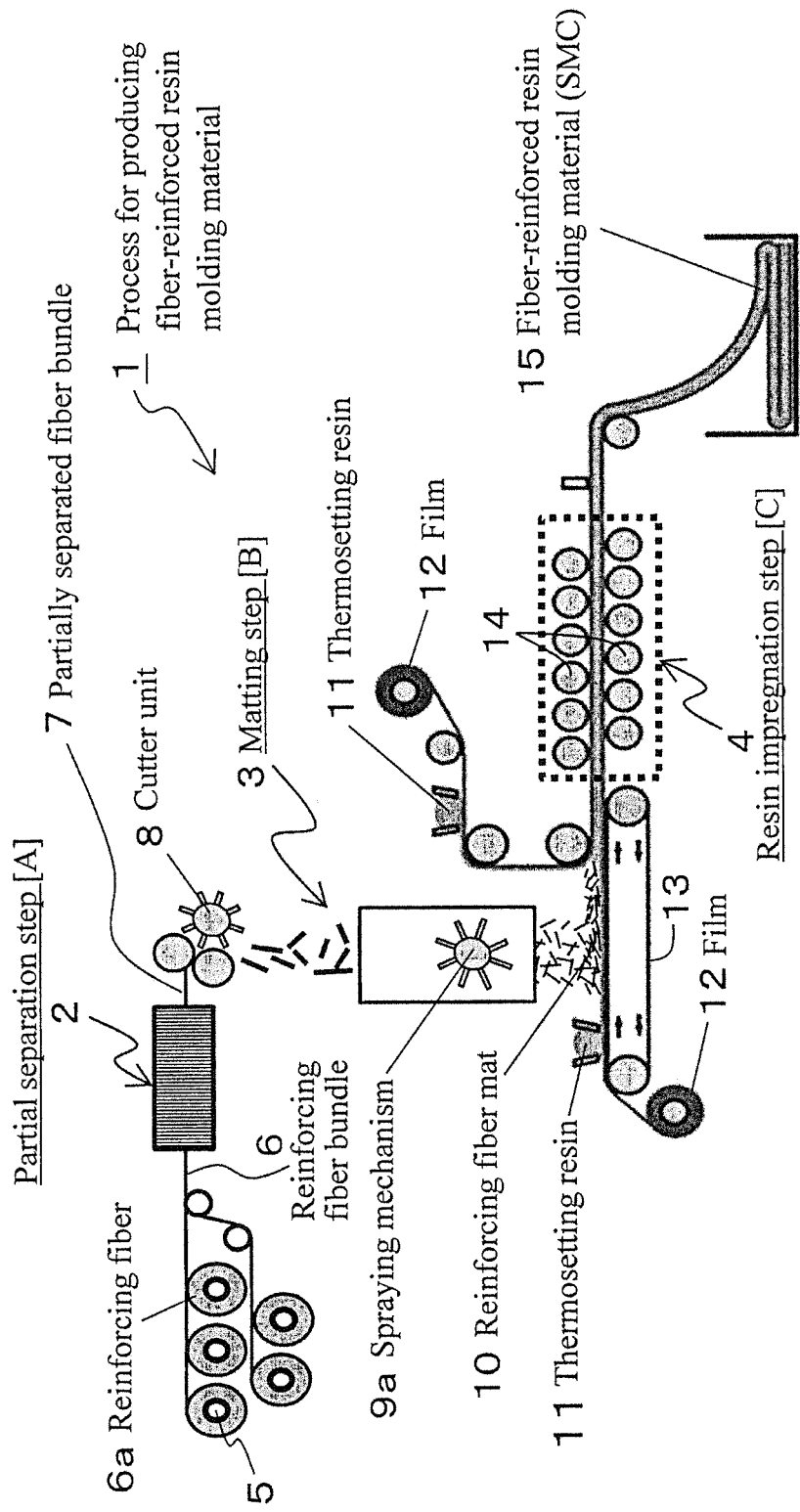
FIG. 12 is a schematic diagram showing a method of producing a fiber-reinforced resin molding material according to an example.

FIG. 12 shows a method of producing a fiber-reinforced resin molding material according to an example. In FIG. 12, symbol 1 denotes the whole of a process of producing a fiber-reinforced resin molding material containing at least a reinforcing fiber mat and a matrix resin, wherein the production process 1 comprises at least a partial separation step [A] 2 for obtaining a partially separated fiber bundle 7 in which separation-processed parts separated into a plurality of bundles and not-separation-processed parts are alternately formed along the lengthwise direction of the reinforcing fiber bundle comprising a plurality of single fibers, and for applying a sizing agent at an arbitrary timing of the step as describe above, a matting step [B] 3 to obtain a reinforcing fiber mat 10 by cutting the partially separated fiber bundle 7 and spraying the cut bundles, and a resin impregnation step [C] 4 in which the reinforcing fiber mat 10 is impregnated with a matrix resin (thermosetting resin 11 in this example).

A reinforcing fiber bundle 6 composed of reinforcing fibers 6a of a plurality of single fibers fed out from a plurality of creels 5 is supplied to the partial separation step [A] 2, partial separation processing is carried out in the step 2 as aforementioned, the partially separated fiber bundle 7 is manufactured. The manufactured partially separated fiber bundle 7 is subsequently (continuously) supplied to the matting step [B] 3, where it is cut into discontinuous fiber bundles by a cutter unit 8 in the step 3, and thereafter, the cut bundles are sprayed through a spraying mechanism 9, for example, on a belt 13 being circulated such that a reinforcing fiber mat 10 is formed. This reinforcing fiber mat 10 is impregnated with a thermosetting resin 11 as a matrix resin, and in this example, the resin impregnation in the resin impregnation step [C] 4 is accelerated such that the reinforcing fiber mat 10 and the supplied thermosetting resin 11 to be impregnated are nipped films 12 sequentially supplied to both upper and lower sides of the reinforcing fiber mat 10, and at the nipped state, they are pressed, for example, between a plurality of resin impregnation rollers 14. The reinforcing fiber mat 10 impregnated with the matrix resin is folded as shown in the figure or wound as a continuous sheet-like fiber-reinforced resin molding material 15 and, thus, a series of continuous fiber-reinforced resin molding material production process 1 is completed. The fiber-reinforced resin molding material 15 is produced, for example, as a sheet molding compound (SMC).

Thus, since first a partially separated fiber bundle 7 is manufactured, the partially separated fiber bundle 7 is cut and sprayed to prepare a reinforcing fiber mat 10 derived from the partially separated fiber bundle, and thereinto the matrix resin 11 is impregnated to obtain the fiber-reinforced resin molding material 15, when cutting and spraying the partially separated fiber bundle 7 to prepare the reinforcing fiber mat 10 as an intermediate base material of fiber bundles of discontinuous fibers, it becomes possible to make thin fiber bundles and thick fiber bundles present at a mixed condition within a range of an optimum ratio, and in the fiber-reinforced resin molding material 15 impregnated with matrix resin 11 thereinto, it becomes possible to exhibit the flowability during molding and the mechanical properties of a molded article at a good balance. In particular, in the manufacturing process of the partially separated fiber bundle 7, as described above, the fiber bundle can be stably slit continuously, and the partially separated fiber bundle 7 in an optimum form can be easily and efficiently produced. Especially, even in a fiber bundle containing twist or a fiber bundle of a large tow having a large number of single fibers, a continuous slit processing becomes possible without worrying about exchange life of a rotary blade. In addition, a continuous slit processing of an inexpensive large tow becomes possible, whereby it may become possible to reduce the material cost and production cost of a finally molded article.

From the viewpoint that it is possible to produce a desired fiber-reinforced resin molding material 15 efficiently, smoothly, and with excellent productivity in the above-described production process 1 of the fiber-reinforced resin molding material, an example is shown as a preferred example wherein a series of the steps [A] to [C] are carried out continuously in one process, but it is not necessary to continuously carry out the series of the steps [A] to [C] in one process, for example, the partially separated fiber bundle obtained through the step [A] may be wound up once and then subjected to the step [B].

Figure 13:
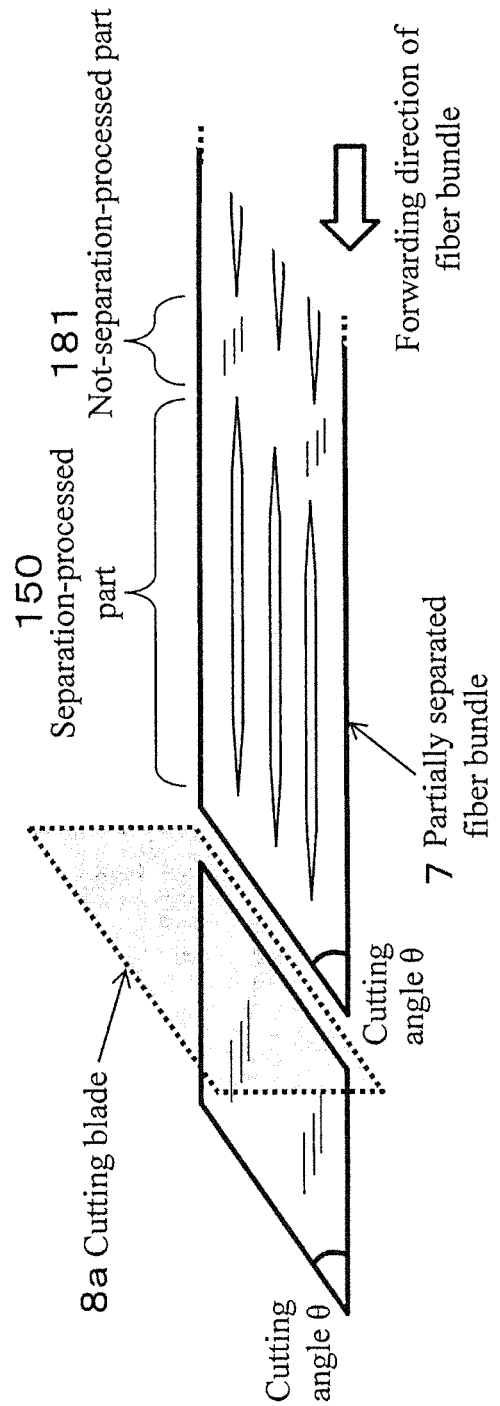
FIG. 13 is a schematic perspective view showing an example of obliquely cutting a partially separated fiber bundle with respect to its lengthwise direction.

Further, when cutting the partially separated fiber bundle 7 in the matting step [B] 3 as shown in FIG. 12, it is also preferred to cut the partially separated fiber bundle 7 at an angle θ (0<θ<90°) with respect to the lengthwise direction of the fiber bundle 7. For example, as shown in FIG. 13, with a cutting blade 8a inclined at an angle θ (0<θ<90°) with respect to the lengthwise direction of the partially separated fiber bundle 7 (running direction of the fiber bundle in the figure), the partially separated fiber bundle 7 is cut. In this way, the chance of the cutting line by the cutting blade 8a to extend over the separation-processed section 150 and the not-separation-processed part 181 increases, and when cutting the partially separated fiber bundle 7 to make the fiber bundle of the discontinuous fibers, because the chance that the discontinuous fiber bundle is formed only from the not-separation-processed part 181 decreases, it becomes possible to form a mat comprising discontinuous fiber bundles with a thinner size. In a fiber-reinforced resin molding material using such a mat, it becomes possible to particularly improve the mechanical properties of a molded article.

EXAMPLES

Next, examples and comparative examples will be explained. This disclosure is not limited in any way to the examples and comparative examples.

Raw Material

Fiber Bundle [A-1]:

A continuous carbon fiber bundle ("PANEX (registered trademark) 35," supplied by ZOLTEK CORPORATION) having a fiber diameter of 7.2 μm, a tensile modulus of elasticity of 240 GPa, and a number of single fibers of 50,000 was used.

Sizing Agent [s-1]:

A reactive urethane resin emulsion ("SuperFlex (registered trademark) R5000," supplied by DKS Co., Ltd.) was used.

Matrix Resin [M-1]:

A resin compound prepared by sufficiently mixing and stirring 100 parts by weight of a vinyl ester resin ("DELAKEN (registered trademark) 790," supplied by Dow. Chemical Co., Ltd.), 1 part by weight of tert-butyl peroxybenzoate ("Perbutyl (registered trademark) Z," supplied by NOF CORPORATION) as a curing agent, 4 parts by weight of magnesium oxide (MgO #40, supplied by Kyowa Chemical Industry Co., Ltd.) as a thickener, and 2 parts by weight of zinc stearate (SZ-2000, supplied by Sakai Chemical Industry Co., Ltd.) was used.

Determination Method of Adhesion Amount of Sizing Agent

A fiber bundle applied with a sizing agent was cut at a length of 1 m, and an ashing treatment was carried out at 450° C. therefor. The weight of the obtained fiber bundle after the ashing treatment was determined, and the adhesion amount of the sizing agent was calculated from the weight reduction rate before and after the ashing treatment. The determination was carried out with respect to 10 fiber bundles, and the average value thereof was calculated.

Evaluation Method of Mechanical Property

After placing the fiber-reinforced resin molding material in the central part of a flat metal mold (50% in terms of charge rate), it was cured under a pressure of 10 MPa by a pressurizing type press machine at a condition of about 140° C. for 5 minutes to obtain a flat plate of 300×400 mm. Five test pieces (total 10 pieces) each having a size of 100×25× 1.6 mm were cut out from the obtained flat plate from the respective directions of 0° and 90° when the lengthwise direction of the flat plate was set to 0°, and based on JIS K7074 (1988), the measurement was carried out. As the mechanical properties, a flexural strength, a flexural modulus, and a CV value (%) of the flexural modulus were determined (CV: coefficient of variation).

Example 1

The fiber bundle [A-1] was unwound using a winder at a constant speed of 10 m/min, and the unwound fiber bundle was passed through a vibration widening roll vibrating in its axial direction at 10 Hz, and after the widening processing was performed, a widened fiber bundle widened to 60 mm was obtained by passing it through a width regulating roll having a width of 60 mm.

The obtained widened fiber bundle was immersed in a sizing treatment liquid prepared by diluting the sizing agent [S-1] with a purified water to apply the sizing agent to the widened fiber bundle, and then, the widened fiber bundle applied with the sizing agent was subjected to a hot roller at 150° C. and a dryer at 200° C. to dry it and remove the moisture. When the obtained widened fiber bundle having been applied with the sizing agent was determined and calculated based on the aforementioned determination method of adhesion amount of sizing agent, it was 3.2%. This is the total adhesion amount including the sizing agent having been applied to an original fiber bundle. Further, the determination was carried out while adjusting a tension applied to the fiber bundle so that the fiber bundle width of the widened fiber bundle was not narrowed by a surface tension.

For the obtained widened fiber bundle having been applied with the sizing agent, a separation means was prepared by setting iron plates for separation processing each having a projected shape with a thickness of 0.2 mm, a width of 3 mm and a height of 20 mm in parallel at equal intervals of 3.5 mm with respect to the width direction of the reinforcing fiber bundle. This separation means was intermittently penetrated into and removed from the widened fiber bundle and was wound onto a bobbin to obtain a partially separated fiber bundle.

At this time, the separation means was penetrated into the widened fiber bundle traveling at a constant speed of 10 m/min for 3 seconds to create a separation-processed section, and the separation means was removed for 0.2 second, and it was penetrated again, and these operations were repeated.

The obtained partially separated fiber bundle was separated into 17 divided parts in the width direction of the fiber bundle in the separation-processed section, and at least at one end portion of at least one separation-processed section, an entanglement accumulation part accumulated with the entangled parts in which the single fibers were interlaced was formed. When the partially separated fiber bundle was manufactured by 1,500 m, the twist of the fibers existing in the fiber bundle passed through in the traveling direction when removing and penetrating the separation means, without causing yarn breakage and winding at all, and it was possible to carry out the separation processing with a stable width.

Subsequently, the obtained partially separated fiber bundle was continuously inserted into a rotary cutter, and the fiber bundle was cut at a fiber length of 25 mm and the cut bundles were sprayed to be uniformly dispersed, whereby a discontinuous fiber nonwoven fabric whose fiber orientation is isotropic was obtained. The areal weight of the obtained discontinuous fiber nonwoven fabric was 1 kg/m'.

The matrix resin [M-1] was uniformly applied to each of two polypropylene release films using a doctor blade to prepare two resin sheets. The discontinuous fiber nonwoven fabric obtained as described above was sandwiched between these two resin sheets from the upper and lower sides, and the resin was impregnated into the nonwoven fabric with rollers to obtain a sheet-like fiber-reinforced resin molding material. At that time, the application amount of the resin was adjusted at the stage of resin sheet preparation so that the weight content of reinforcing fibers in the fiber-reinforced resin molding material became to be 47%. With respect to the fiber-reinforced resin molding material obtained, the fiber-reinforced resin molding material was molded based on the aforementioned evaluation method of mechanical properties and the mechanical properties were evaluated. As a result, the flexural strength was 440 MPa, the flexural modulus was 28 GPa, and the CV of the flexural modulus was 6%.

Example 2

The evaluation was carried out in the same manner as in Example 1 other than a condition where the sizing agent application was performed after the fiber bundle [A-1] was unwound using a winder at a constant speed of 10 m/min, and the unwound fiber bundle was passed through a vibration widening roll vibrating in its axial direction at 10 Hz, and after the widening processing was performed, a widened fiber bundle widened to 60 mm was obtained by passing it through a width regulating roll having a width of 60 mm, and the separation processing was performed to the widened fiber bundle to obtain a partially separated fiber bundle. As a result, the adhesion amount of the sizing agent was 3.3%, the flexural strength was 430 MPa, the flexural modulus was 27 GPa, and the CV of the flexural modulus was 8%.

Example 3

The evaluation was carried out in the same manner as in Example 1 other than a condition where after the fiber bundle [A-1] was unwound using a winder at a constant speed of 10 m/min and the unwound fiber bundle was immersed in a sizing agent treatment liquid, the fiber bundle was passed through a vibration widening roll vibrating in its axial direction at 5 Hz to obtain a widened fiber bundle finished with sizing agent applying, the separation processing was performed to the widened fiber bundle finished with sizing agent applying, the prepared partially separated fiber bundle finished with sizing agent applying was subjected to a drying step to obtain a partially separated fiber bundle. As a result, the adhesion amount of the sizing agent was 3.2, the flexural strength was 435 MPa, the flexural modulus was 28 GPa, and the CV of the flexural modulus was 7%.

As described above, in any of Examples 1 to 3, it was confirmed that excellent mechanical properties (flexural strength, flexural modulus) and low variation were both exhibited. Further, when unwinding the partially separated fiber bundle and inserting it into the cutter, it could be unwound stably without causing winding around the bobbin. Furthermore, in the discontinuous fiber nonwoven fabric, the cut fiber bundle kept a convergence as a bundle, and the occurrence of single fiber fluffs was suppressed.

Further, in Example 1, since the partial separation processing was performed after the sizing agent was applied, almost no fluffs were accumulated in the separation means, and the separation processing could be stably performed. In Example 2, since the sizing agent was applied after the partial separation processing was performed, the convergence of the fiber bundle of the separation-processed section divided by the separation processing was high, and the occurrence of single fiber fluffs when obtaining the discontinuous fiber nonwoven fabric was most suppressed. In Example 3, since the sizing agent was applied and the widening processing was carried out in the state of so-called wetting thread before drying, the friction between single fibers in the fiber bundle was alleviated and, further, the sizing agent played the role of a lubricant, it was possible to widen to a target widened width even by a low frequency in vibration.

INDUSTRIAL APPLICABILITY

Our methods can be applied to any fiber bundle in which it is desired to separate a fiber bundle comprising a plurality of single fibers into two or more thin bundles, and by applying a sizing agent at an adequate timing, it can be maintained in an adequate partially separated form. In particular, when reinforcing fibers are used, the obtained partially separated fiber bundle can be impregnated with a matrix resin and used for any reinforcing fibers composite material.

The invention claimed is:

1. A method of producing a partially separated fiber bundle comprising a partial separation processing step that alternately forms separation-processed sections, each divided into a plurality of bundles, and not-separation-processed sections, wherein, while a fiber bundle to which a sizing agent has been applied and comprises a plurality of single fibers travels along a lengthwise direction of the fiber bundle, a separation means provided with a plurality of projected parts is penetrated into the fiber bundle to create a separation-processed part, and entangled parts, where the single fibers are interlaced, are formed at contact parts with the projected parts in at least one separation-processed part, thereafter the separation means is removed from the fiber bundle, and after the separation means passing through a position of the fiber bundle corresponding to an entanglement accumulation part including the entangled parts, the separation means is penetrated again into the fiber bundle, wherein an additional sizing agent is applied at an operator selected time during production of the partially separated fiber bundle.

2. The method according to claim 1, wherein the fiber bundle is supplied to the partial separation processing step after widening the width of the fiber bundle.

3. The method according to claim 2, wherein the fiber bundle is supplied to the partial separation processing step after applying the additional sizing agent to the fiber bundle widened in width.

4. The method according to claim 1, further comprising drying the additional sizing agent at an operator selected time.

5. The method according to claim 4, wherein a width of the fiber bundle before drying is widened during the applying the additional sizing agent, the widened fiber bundle is subjected to the drying, the fiber bundle having undergone application of the additional sizing agent and the widening is supplied to the partial separation processing step.

6. A method of producing a partially separated fiber bundle comprising a partial separation processing step that alternately forms separation-processed sections, each divided into a plurality of bundles, and not-separation-processed sections, wherein a separation means provided with a plurality of projected parts is penetrated into a fiber bundle to which a sizing agent has been applied and comprises a plurality of single fibers, while the separation means travels along a lengthwise direction of the fiber bundle, a separation-processed part is created, and entangled parts, where the single fibers are interlaced, are formed at contact parts with the projected parts in at least one separation-processed part, thereafter the separation means is removed from the fiber bundle, and after the separation means travels up to a position passing through a position of the fiber bundle corresponding to an entanglement accumulation part including the entangled parts, the separation means is penetrated again into the fiber bundle, wherein an additional sizing agent is applied at an operator selected time during production of the partially separated fiber bundle.

* * * * *